United States Patent Office 3,038,015
Patented June 5, 1962

3,038,015
PREPARATION OF ORGANIC NITRO COMPOUNDS
Nathan Kornblum, West Lafayette, Ind., assignor to Purdue Research Foundation, Lafayette, Ind., a corporation of Indiana
No Drawing. Filed Feb. 11, 1958, Ser. No. 714,499
10 Claims. (Cl. 260—644)

This invention relates to the preparation of organic nitro compounds, and especially to the preparation of aliphatic and alicyclic nitro compounds containing more than four carbon atoms. This case is a continuation-in-part of my copending application Serial No. 505,560, filed May 2, 1955 which, in turn, is a continuation-in-part of my prior copending application Serial No. 212,527, filed February 23, 1951, now abandoned.

Much interest has been shown in nitro compounds wherein the nitro group is situated on a saturated carbon atom; these compounds are known as nitro-alkanes and nitro cycloalkanes.

The nitro-alkanes to which this invention relates have the general formulas

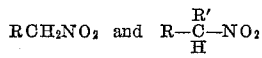

$$RCH_2NO_2 \text{ and } R-\underset{H}{\overset{R'}{C}}-NO_2$$

wherein R and R' can be any organic group. Despite their rather considerable interest, a satisfactory general laboratory or commercial synthesis for these nitro compounds had not been evolved. These nitro compounds are desired for use as intermediates in pharmaceutical manufacture, rocket propellants, explosives, diamine manufacture, lacquer solvents, flotation agents, wetting agents, and as research chemicals.

Of the known methods of preparing nitro-alkanes, the vapor phase nitration is most economical and satisfactory for compounds having four or less carbon atoms while the standard method of synthesizing nitro-alkanes of more than four carbon atoms has been and remains the Victor-Meyer reaction in which solid silver nitrite is reacted with the corresponding halo-alkane. This is true despite the high cost of the reactants due to the fact that when vapor phase nitration of compounds having more than four carbons is attempted, miscellaneous oxidation and degradation products are obtained and the nitro compounds formed are in a complex mixture of products since it is not feasible to pinpoint the nitro group onto a predetermined position of a complex molecule by the vapor phase nitration.

Efforts have been made to prepare nitro compounds by the addition of nitrogen peroxide and other nitrogen compounds to double bonds, but the results have not been uniformly satisfactory. Efforts have also been made to produce high nitro alkanes from nitro alcohols prepared by the reaction of aldehydes with lower nitro paraffins, but here again the results have not been completely satisfactory. Attempts to oxidize aliphatic amines to the corresponding nitro compounds have not resulted in a practical commercial process.

It is an object of the present invention to provide a method of synthesizing nitro alkanes and nitro cycloalkanes in satisfactory yields. Another object of the present invention is to provide a method of introducing a nitro group into a particular position in a complex molecule. An additional object is to provide a general method of synthesizing nitro alkanes and nitro cycloalkanes which is satisfactory despite the complexity of the starting compound. Other objects will become apparent as the invention is further described.

I have found that the foregoing objects are attained when I react in dimethylformamide an alkali metal nitrite with an ester of a primary or secondary alcohol and an acid selected from the group consisting of hydrobromic, hydroiodic, and certain sulfonic acids. Additives such as catechol and urea to suppress side reaction or increase the rate of reaction may be present.

The following examples are given by way of illustration and not as limitations of the invention. Throughout the examples, the quantities of ingredients used are given as parts by weight.

EXAMPLE 1

Preparation of 1-nitroheptane from 1-bromoheptane. 1-bromoheptane (54 parts) was added rapidly to 36 parts of dry sodium nitrite in 572 parts of dry dimethylformamide. After stirring for six hours, the light yellow solution was poured into ice water, extracted with petroleum ether, dried over magnesium sulfate and rectified. There was obtained 11.09 parts (25% yield) of 1-heptyl nitrite (B.P. 42°/9 mm.; $n_D^{20}$ 1.4061) and then, after a small intermediate fraction, 25.9 parts (60% yield) of pure 1-nitroheptane; (B.P. 68°/3 mm.; $n_D^{20}$ 1.4284).

In the presence of 40 parts of urea the reaction time was cut to two hours but the yields of 1-heptyl nitrite and 1-nitroheptane remained the same (27% and 59% respectively).

EXAMPLE 2

Preparation of 1-nitroheptane from 1-iodoheptane. 1-iodoheptane (68 parts) was added rapidly to 36 parts of dry sodium nitrite in 572 parts of dry dimethylformamide. After stirring for three hours, the resulting dark yellow solution was worked up as described in Example 1. This gave 11.49 parts (27% yield) 1-heptyl nitrite (B.P.$_{.20}$ 40°/8 mm.; $n_D^{20}$ 1.4060) and 25.44 parts (59% yield) of 1-nitroheptane (B.P. 56°/1 mm.; $n_D^{20}$ 1.4281).

In the presence of 40 parts of urea the reaction time was decreased to one hour but the yields of 1-heptyl nitrite and 1-nitroheptane remained the same (27% and 28%, respectively).

EXAMPLE 3

Preparation of 2-nitrooctane from 2-bromooctane. 2-bromooctane (58 parts) was added rapidly to 36 parts of dry sodium nitrite and 40 parts of urea in 572 parts of dry dimethylformamide. After stirring for twelve hours the resulting blue-green solution was worked up as described in Example 1. This gave 12.03 parts (26% yield) of 2-octyl nitrile (B.P. 47°/9 mm.; $n_D^{20}$ 1.4090) and 24.2 parts (50% yield) of 2-nitrooctane (B.P. 72°/3 mm.; $n_D^{20}$ 1.4280).

EXAMPLE 4

Preparation of 2-nitrooctane and 2-iodooctane. 2-iodooctane (72 parts) was added rapidly to 36 parts of dry sodium nitrite and 40 parts of urea in 572 parts of dry dimethylformamide. After stirring for three hours at room temperature, the mixture was poured into ice-water, extracted with petroleum ether (B.P. 35–37°), dried and rectified. This gave 13.0 parts (28% yield) of 2-octyl nitrite (B.P. 41–42°/6 mm.) which, after a small interfraction, was followed by 28.4 parts (60% yield) of pure 2-nitrooctane; (B.P. 60°/1 mm.; $n_D^{20}$ 1.4280).

Repetition of this experiment, except for the omission of urea from the reaction mixture and for the use of an eight hour reaction time, gave 26.13 parts (55% yield) of 2-nitrooctane.

EXAMPLE 5

Preparation of nitrocyclopentane from cyclopentyl iodide. To a stirred mixture of 620 parts of dry dimethyl formamide, 40 parts of urea and 36 parts of dry sodium nitrite maintained at −20 to −15° C. was added 60 parts of cyclopentyl iodide. The flask was stoppered and stirring continued for 64 hours at −20 to −15° C. The reaction mixture was poured into ice water, extracted with petroleum ether and dried. After removal of most of the solvent, the crude product was chromatographed on acid washed alumina; petroleum ether was used for elution. Distillation gave 18.2 parts (53%) of nitrocyclopentane (B.P. 76°/21 mm.; $n_D^{20}$ 1.4540).

In a similar run at 0° C., a 15% yield of cyclopentyl nitrite and a 31% yield of nitrocyclopentane was isolated.

EXAMPLE 6

Preparation of 3-phenyl-1-nitropropane from 3-phenyl-1-iodopropane. To a stirred mixture of 620 parts of dry dimethylformamide, 40 parts of urea and 36 parts of dry sodium nitrite was added 74 parts of 3-phenyl-1-iodopropane. After a reaction time of one hour the product was worked up as in Example 1, except that a total of 528 parts of benzene was used to extract the products from the aqueous dimethylformamide. Distillation gave 12.7 parts (26%) of γ-phenylpropyl nitrite (B.P. 56°/1 mm.; $n_D^{20}$ 1.4979). Continued distillation gave 29.0 parts (58%) of 3-phenyl-1-nitropropane (B.P. 122–3°, $n_D^{20}$ 1.5222).

EXAMPLE 7

The preparation of phenylnitromethane from benzyl bromide. This reaction, using 51.3 parts of benzyl bromide, was carried out at −20° to −15° in a manner exactly analogous to the run employing cyclopentyl iodide (Example 5) except for a reaction time of five hours and, also, that diethyl ether was used as the extracting solvent. There was obtained 14.3 parts (35%) of benzyl nitrite (B.P. 44°/5 mm., $n_D^{20}$ 1.5008) and 21.2 parts (52%) of phenylnitromethane (B.P. 76°/5 mm., $n_D^{20}$ 1.5316).

EXAMPLE 8

The preparation of 1-nitrooctane from n-octyl tosylate. The reagents used were 572 parts of dry dimethylformamide, 40 parts of urea, 36 parts of dry sodium nitrite and 85 parts of n-octyl tosylate. The reaction conditions and manner of working up were those of Example 1, except that the reaction time was 8.5 hours and the reaction vessel was held in a water bath at room temperature. There were obtained on vacuum distillation 13.1 parts (28% yield) of n-octyl nitrite (B.P. 81°/25 mm., $n_D^{20}$ 1.4127) and 20.3 parts (43% yield) of 1-nitrooctane (B.P. 60°/1 mm., $n_D^{20}$ 1.4324).

EXAMPLE 9

The preparation of 1-nitrobutane from n-butyl methanesulfonate. The reagents employed were 310 parts of dry dimethylformamide, 20 parts of urea, 18 parts of dry sodium nitrite and 22.8 parts of n-butyl methanesulfonate and the reaction was conducted as in Example 8 except that the reaction time was 7.5 hours and furthermore, during this time, the system was evacuated to 35 mm. An ice trap, a Dry Ice trap and a potassium hydroxide drying tower were interposed between the pump and the reaction mixture. The colorless contents of the ice trap were returned to the reaction mixture in the flask. The yellow contents of the Dry Ice trap gave 2.70 parts (18%) of n-butyl nitrite on distillation.

The reaction mixture was worked up in the usual manner using petroleum ether as the extractant, except that 250 parts of urea were added to the aqueous layer to "salt out" the product. There was obtained 7.0 parts (46%) of 1-nitrobutane (B.P. 60°/30 mm.; $n_D^{20}$ 1.4107).

EXAMPLE 10

Preparation of 1-nitroheptane from 1-iodoheptane and sodium nitrite in a catechol-dimethylformamide solution. Twenty-four and one-tenth parts of sodium nitrite, 55 parts of catechol, and 215 parts of dimethylformamide were stirred until all but a small amount of the sodium nitrite had dissolved. Forty-five and two-tenths parts of 1-iodoheptane was then added over a period of 10 minutes, the system was flushed with nitrogen and the reaction allowed to proceed with stirring under a nitrogen atmosphere for 6 hours.

The black reaction mixture was then filtered and the filtrate was distilled at a temperature of 70 to 100° C. and at pressures down to 2 mm. The distillate was poured, with stirring, into 10% aqueous sulfuric acid, and the resulting mixture was extracted with petroleum ether and dried.

The petroleum ether was removed by distillation at atmospheric pressure and the residual liquid distilled at reduced pressure. There was obtained 20.3 parts (70% yield) of 1-nitroheptane (B.P. 69–77°/4–5 mm., $n_D^{20}$ 1.4278).

EXAMPLE 11

Preparation of 2-nitrooctane from 2-iodooctane and sodium nitrite in a catechol-dimethylformamide solution. 2-nitrooctane was prepared in a manner similar to that of Example 10, using 24.1 parts of sodium nitrite, 55 parts of catechol, 215 parts of dimethylformamide and 48 parts of 2-iodooctane. The reaction was run for 20 hours and the product was worked up as described previously. There was obtained 20.0 parts (63% yield) of 2-nitrooctane (B.P. 105°/20 mm., $n_D^{20}$ 1.4274).

EXAMPLE 12

Preparation of 1-nitrooctane from 1-iodooctane. 1-iodooctane (72 parts) was added rapidly to 49 parts of potassium nitrite and 40 parts of urea in 670 parts of dimethylformamide. After stirring for an hour and a half, the resulting solution was worked up in the usual manner using petroleum ether as the extractant. There was obtained 27.7 parts (58% yield) of 1-nitro-octane.

As will be noted, the present process provides a method for the preparation of nitro compounds of practically any number of carbon atoms. The known methods of producing nitro compounds are perhaps commercially superior to the present process with respect to compounds having four or less carbon atoms, so its real importance lies in the longer chain compounds. Even with the shorter chain compounds, the present process possesses the advantage of permitting the pinpointing of the nitro group since it will always attach to the carbon atom which contained the alcoholic linkage.

The reaction between the alkali metal nitrite and the ester will occur only when appreciable amounts of both reactants are dissolved in the reaction media. While other solvents for the reactants are operative, dimethyl formamide is amazingly superior. The following examples illustrate this superiority.

EXAMPLE 13

Seventy-two parts of 1-iodooctane was introduced into a solution of 28 parts of lithium nitrite dissolved in 565 parts of absolute ethanol, and the mixture was stirred continuously while samples were withdrawn at intervals and titrated with silver nitrate to determine the extent of the reaction. After 108 hours, the reaction was found to be 90% complete. Upon separation, 18.99 parts (39% yield) of 1-nitrooctane was obtained.

EXAMPLE 14

The reaction was carried out as described in Example 13, except that acetone was used as the solvent. The reaction was found to be 90% complete after 96 hours and 17.31 parts (37% yield) of 1-nitrooctane was recovered.

EXAMPLE 15

The reaction was carried out as described in Example 13, except that dimethyl formamide was used as the solvent. The reaction was found to be complete in three hours, and 26.87 parts (57% yield) of 1-nitrooctane was recovered.

EXAMPLE 16

*Preparation of 1-Nitrodecane From 1-Iododecane*

1-iododecane (53.6 parts) was added rapidly to 24.2 parts of sodium nitrite in 400 parts of dimethylformamide. After stirring for three hours, the reaction mixture was worked up as described in Example 1. This gave 22.1 parts (60% yield) of colorless 1-nitrodecane (B.P. 86–87°/1.5 mm.; $n_D^{20}$ 1.4386).

EXAMPLE 17

*Preparation of 1-Nitrodecane From 1-Bromodecane*

1-bromodecane (44.2 parts) was added rapidly to 24.2 parts of sodium nitrite in 400 parts of dimethylformamide. After stirring for six hours, the reaction mixture was worked up as described in Example 1. This gave 21.6 parts (58% yield) of colorless 1-nitrodecane (B.P. 86–87°/1.5 mm.; $n_D^{20}$ 1.4387).

EXAMPLE 18

*Preparation of α-Phenylnitroethane From α-Phenylethyl Bromide*

α-Phenylethyl bromide (65.13 parts) was added dropwise over a 5 minute period to 35.6 parts of dry sodium nitrite and 47.35 parts of dry urea in 550 parts of dry dimethylformamide while maintaining the stirred reaction mixture at −18° C. Stirring and a temperature of −18° C. were maintained for 13.5 hours. The reaction mixture was poured into ice water and extracted first with benzene and then with diethyl ether. The combined ether-benzene extracts were washed with water and dried over anhydrous magnesium sulfate. After filtering, the solvents and the α-phenylethyl nitrite were removed by vacuum distillation. The residual liquid was shaken with 85% phosphoric acid and then treated at 0° C. with 2,4-dinitrophenyl hydrazine in 2 N aqueous HCl. After filtering to remove a small amount of acetophenone 2,4-dinitrophenyl hydrazone, the organic layer was dissolved in ether, washed with water, and dried over magnesium sulfate. After filtration the product was rectified. A 43% yield (22.9 parts) of colorless α-phenylnitroethane; B.P. 76°/1 mm.; $n_D^{20}$ 1.5213 was obtained.

EXAMPLE 19

*Preparation of 1-Nitrododecane From 1-Iodododecane*

1-iodododecane (17.4 parts) was added rapidly to 7.1 parts of sodium nitrite in 170 parts of dimethylformamide. After stirring for three and one half hours, the reaction mixture was worked up as in Example 1. This gave 6.3 parts (50% yield) of pure, colorless 1-nitrododecane (B.P. 100°/0.5 mm.; $n_D^{20}$ 1.4434). Analysis: Calc'd for $C_{12}H_{25}NO_2$: C, 66.93%; H, 11.70; Found, C, 66.66%; H, 11.85%.

EXAMPLE 20

*Preparation of 1-Nitrooctadecane From 1-Iodooctadecane*

1-iodooctadecane (19 parts) was added rapidly to 6.0 parts of sodium nitrite in 350 parts of dimethylformamide. The reaction mixture was stirred and maintained at 35–37° C. for eight hours after which it was poured into ice water and extracted with petroleum ether (B.P. 35–37°) and with diethyl ether. The combined extracts were washed with aqueous sodium thiosulfate, with water and then dried over anhydrous sodium sulfate. After removal of the solvents the crystalline residue was purified by recrystallization from acetone and petroleum ether and by chromatographing a petroleum ether solution on acid washed alumina. This gave 8.1 parts (54% yield) of pure, white, crystalline 1-nitrooctadecane, M.P. 42.5–43°. Analysis: Calc'd for $C_{18}H_{37}NO_2$: N, 4.71%; Found: N, 5.01%.

EXAMPLE 21

*The Preparation of 1-Nitrodecane From n-Decyl Tosylate*

The reagents are 57.2 parts of dimethylformamide, 4 parts of urea, 3.6 parts of sodium nitrite and 9.3 parts of n-decyl tosylate. The reaction time, conditions and manner of working up are the same as in Example 8. There is obtained 2.52 parts (45% yield) of 1-nitrodecane (B.P. 86°/1 mm.; $n_D^{20}$ 1.4387).

EXAMPLE 22

*Preparation of 2-Nitrotridecane From 2-Iodotridecane*

2-iodotridecane (26.6 parts) was added rapidly to 11.9 parts of sodium nitrite and 13.3 parts of urea in 325 parts of dimethylformamide. The reaction mixture was stirred for seven hours and then worked up as in Example 1. This gave 11.6 parts (59% yield) of pure, colorless 2-nitrotridecane (B.P. 120°/1 mm.; $n_D^{20}$ 1.4421). Analysis: Calc'd for $C_{13}H_{27}NO_2$: N, 6.11%; Found: N, 6.42%.

EXAMPLE 23

*Preparation of Nitrocyclopentadecane From Iodocyclopentadecane*

Iodocyclopentadecane (29.7 parts) was added rapidly to 11.9 parts of sodium nitrite and 13.3 parts of urea in 370 parts of dimethylformamide. The reaction mixture was stirred for five hours at room temperature and then for two hours at 35°. It was worked up as in Example 1 but the crude product instead of being distilled was subjected to chromatography on acid washed alumina. This gave 13.6 parts (60% yield) of colorless, nitrocyclopentadecane ($n_D^{20}$ 1.4950). This compound exhibits the characteristic infrared absorption of a secondary nitro compound; i.e., absorption maxima at 6.47μ and 7.30μ. Analysis: Calc'd for $C_{15}H_{29}NO_2$: N=5.48%; Found: N=4.48%.

Examples 13, 14, and 15 show that a substantially higher yield of the nitro compound is obtained in a dimethylformamide reaction media, and that the rate of reaction is at least 40 times that occurring in either an acetone or ethanol medium.

The reaction, therefore, may be represented as follows:

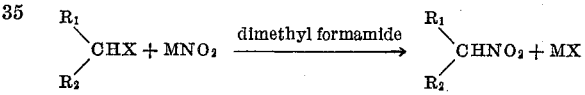

wherein $R_1$ is an alkyl or aryl radical, $R_2$ is hydrogen or an alkyl radical, or $R_1$ and $R_2$ may be joined to form a cycloalkane segment, M is an alkali metal, and X is a bromo-, iodo-, or methane sulfo-acid or toluene sulfo-acid radical. Accordingly, suitable starting materials include the bromo-, iodo-, and methane sulfo-esters or toluene sulfo-esters of cycloalkanols, primary alkanols, secondary alkanols, benzyl-alkanol, 3 phenyl-n-propanol, and phenyl ethanol. As the alkali metal nitrite I may use lithium, sodium or potassium nitrite. The reaction may be conducted over a temperature range of from −20° C. to 40° C., in most cases room temperature is satisfactory.

As the examples show, the addition of urea serves to increase the rate of reaction without affecting the yield. This activity is apparently due to the increased solubility of the alkali metal nitrite in the dimethylformamide containing urea. The optimum concentration of urea is about equimolar with that of the alkali metal nitrite, but the inclusion of lesser or greater amounts is in no way deleterious to the process.

The presence of catechol apparently serves to prevent or reduce a side reaction (nitrosation) of the desired nitro alkane and, therefore, can serve a useful purpose. Unfortunately, the recovery of the nitroalkane from the reaction mixture is hampered by the presence of catechol to such an extent that the loss of nitro alkane from isolation difficulties overcomes the gain from the stabilizing effect. In cases where the nitro alkane need not be isolated, or if a method for more adequate isolation becomes available, the addition of catechol will confer a definite advantage.

The present invention has been fully described in the foregoing. I intend to be limited, therefore, only by the following claims.

I claim:

1. A process as claimed in claim 10, wherein urea is present to increase the rate of reaction.

2. A process as claimed in claim 10, wherein a quantity of urea about equimolar to the alkali metal nitrite is present.

3. A process as claimed in claim 10, wherein catechol is present as a side-reaction depressant.

4. A process as claimed in claim 10, wherein the temperature is maintained between −20° and 40° C.

5. A process as claimed in claim 10 wherein the alkali metal nitrite is sodium nitrite.

6. A process for the preparation of nitro alkanes which comprises mixing in dimethylformamide an alkali metal nitrite with an ester of a primary alkanol and an acid selected from the group consisting of hydrobromic, hydroiodic toluene sulfonic acid, and methyl sulfonic acid.

7. A process as claimed in claim 10, wherein urea is present and the temperature is maintained between −20° and 40° C.

8. A process for the preparation of a nitro alkane which comprises mixing n-octyl tosylate and an alkali metal nitrite in dimethylformamide.

9. A process for the preparation of a nitrocycloalkane which comprises mixing cyclopentyl iodide and an alkali metal nitrite in dimethylformamide.

10. A process for preparing a mononitroalkane which comprises mixing in dimethylformamide an alkali metal nitrite and an ester of a monohydric alcohol selected from the group consisting of cycloalkanols, primary alkanols, secondary alkanols, benzyl alcohol, 3-phenyl-n-propanol, and phenyl ethanol with an acid selected from the group consisting of hydrobromic acid, hydroiodic acid, toluene sulfonic acid, and methyl sulfonic acid.

No references cited.

UNITED STATES PATENT OFFICE
CERTIFICATE OF CORRECTION

Patent No. 3,038,015                        June 5, 1962

Nathan Kornblum

It is hereby certified that error appears in the above numbered patent requiring correction and that the said Letters Patent should read as corrected below.

Column 2, line 36, for "28%" read -- 58% --; line 45, for "nitrile" read -- nitrite --; same column 2, line 50, for "and" read -- from --; column 4, line 21, for "105°/20 mm." read -- 95-105°/20 mm. --; line 30, for "27.7" read -- 27.2 --; column 5, line 47, for "11.70" read -- 11.70% --; column 6, line 43, for "or" read -- and --; line 45, for "benzyl-alkanol, 3 phenyl-" read -- benzyl-alcohol, 3-phenyl- --.

Signed and sealed this 1st day of January 1963.

(SEAL)
Attest:

ERNEST W. SWIDER                        DAVID L. LADD
Attesting Officer                        Commissioner of Patents